(12) United States Patent
Tsou et al.

(10) Patent No.: US 12,511,436 B2
(45) Date of Patent: Dec. 30, 2025

(54) DATA MARKET SYSTEM

(71) Applicant: DeCloak Intelligences Co., Taipei (TW)

(72) Inventors: Yao-Tung Tsou, Taipei (TW); Juang-Ying Chueh, Taipei (TW)

(73) Assignee: DeCloak Intelligences Co., Taipei (TW)

( * ) Notice: Subject to any disclaimer, the term of this patent is extended or adjusted under 35 U.S.C. 154(b) by 434 days.

(21) Appl. No.: 18/091,385

(22) Filed: Dec. 30, 2022

(65) Prior Publication Data

US 2023/0214528 A1 Jul. 6, 2023

Related U.S. Application Data

(60) Provisional application No. 63/294,847, filed on Dec. 30, 2021.

(51) Int. Cl.
*G06F 21/00* (2013.01)
*G06F 21/62* (2013.01)
*H04L 9/00* (2022.01)

(52) U.S. Cl.
CPC .......... *G06F 21/6254* (2013.01); *H04L 9/008* (2013.01)

(58) Field of Classification Search
CPC .............................. G06F 21/6254; H04L 9/008
See application file for complete search history.

(56) References Cited

U.S. PATENT DOCUMENTS

2016/0105402 A1* 4/2016 Soon-Shiong .......... H04L 9/008 713/164
2020/0073560 A1* 3/2020 Adanve ................... H04L 9/065

FOREIGN PATENT DOCUMENTS

CN 109583895 A 4/2019
CN 113221162 A 8/2021

OTHER PUBLICATIONS

Taylor et al., "Robust Smartphone App Identification via Encrypted Network Traffic Analysis", IEEE Transactions on Information Forensics and Security, vol. 13, No. 1, January (Year: 2018).*
Khan et al., "AnonymousCloud: A Data Ownership Privacy Provider Framework in Cloud Computing", 2012 IEEE 11th International Conference on Trust, Security and Privacy in Computing and Communications, Liverpool, UK, pp. 170-176 (Year: 2012).*

* cited by examiner

*Primary Examiner* — Morshed Mehedi
(74) *Attorney, Agent, or Firm* — Winston Hsu

(57) ABSTRACT

A data market system located at the Internet includes a storage circuit, an input surface circuit, and a processor. The input surface circuit is used for receiving a query and an encrypted data packet. The processor is used for controlling the input surface circuit to receive the encrypted data packet and to store the encrypted data packet in the storage circuit. The processor processes the encrypted data packet according to the query. The encrypted data packet corresponds to at least one of anonymization application programming interface, blockchain, differential privacy, and homomorphic encryption provided by the data market system.

10 Claims, 6 Drawing Sheets

DATA MARKET SYSTEM

CROSS REFERENCE TO RELATED APPLICATIONS

This application claims the benefit of U.S. Provisional Application No. 63/294,847, filed on Dec. 30, 2021. The content of the application is incorporated herein by reference.

BACKGROUND OF THE INVENTION

1. Field of the Invention

The present invention relates to a data market system, and particularly to a data market system that can provide more flexible data usage/analysis, make data more usable, and protect privacy of an owner of data.

2. Description of the Prior Art

In the prior art, blockchain can work over peer-to-peer (P2P) and does not require any trusted-third party authorization for data tracking and storage, and information stored in the blockchain is distributed throughout decentralized network and usually protected by using cryptographic hash function.

Although the blockchain claims that can anonymize owner identity corresponding to information stored in the blockchain and protect integrity of the information, when a private key held by the owner is revealed, other transactions of the owner in the blockchain also get revealed due to using linking phenomenon. In addition, anonymity property of the blockchain can also be compromised by using such as linking attacks.

In addition, in the prior art, differential privacy (DP) can efficiently perturb (de-identify) data to protect privacy of an owner of the data, that is, any observer cannot identify information of the owner corresponding to the de-identified data through the de-identified data. In addition, when the data is de-identified, the data has been destroyed and cannot be restored, so although a trend change in statistics characteristics of the de-identified data can consist with a trend change in statistics characteristic of the data, accuracy of the statistics characteristic of the de-identified data is lower than accuracy of the statistics characteristic of the data.

Because the blockchain and the differential privacy have the above-mentioned disadvantages, how to design a data system that can not only protect the privacy of the owner of the data in an anonymous way, but also provide diversified data types (restored data and unrestored data) has become an important issue in the Internet age.

SUMMARY OF THE INVENTION

An embodiment of the present invention provides a data market system. The data market system includes a storage circuit, an input surface circuit, and a processor. The input surface circuit receives a query and an encrypted data packet. The processor controls the input surface circuit to receive the encrypted data packet and to store the encrypted data packet in the storage circuit. The processor processes the encrypted data packet according to the query, and the encrypted data packet corresponds to at least one of anonymization application programming interface, blockchain, differential privacy, and homomorphic encryption provided by the data market system.

According to another aspect of the invention, a data structure of the encrypted data packet includes an encrypted Internet protocol (IP) address, an encrypted owner identity, and encrypted data.

According to another aspect of the invention, the data market system further includes an output surface circuit, wherein the processor processes the encrypted data packet to obtain a processing result according to the query, and controls the output surface circuit to output the processing result.

According to another aspect of the invention, an owner registered in the data market system first utilizes the anonymization application programming interface, the blockchain, and the differential privacy and the blockchain through a user interface (UI) of the data market system to encrypt an internet protocol address, an owner identity, and data to obtain the encrypted internet protocol address, the encrypted owner identity, and the encrypted data, respectively.

According to another aspect of the invention, the encrypted data is not analyzed to obtain the owner identity corresponding to the data, and the processor executes statistics analysis on the encrypted data according to the query to obtain the processing result, wherein a trend change in statistics characteristic of the processing result consists with a trend change in statistics characteristic of the data, but accuracy of the statistics characteristic of the processing result is lower than accuracy of the statistics characteristic of the data.

According to another aspect of the invention, an owner registered in the data market system first utilizes the anonymization application programming interface, the blockchain, and the homomorphic encryption and the blockchain through a user interface of the data market system to encrypt an internet protocol address, an owner identity, and data to obtain the encrypted internet protocol address, the encrypted owner identity, and the encrypted data, respectively.

According to another aspect of the invention, the processor directly executes operation on the encrypted data according to the query to obtain the processing result, and the processing result is still encrypted by the homomorphic encryption, wherein the processing result is capable being decrypted by a private key provided by the owner.

According to another aspect of the invention, a buyer registered in the data market system issues the query to the data market system through a user interface of the data market system.

Another embodiment of the present invention provides a data market system. The data market system includes an input surface circuit and a processor. After the input surface circuit receives a query and transmits the query to the processor, the processor broadcasts the query in the Internet and receives an encrypted data packet corresponding to the query through the input surface circuit, and processes the encrypted data packet according to the query, wherein the encrypted data packet corresponds to at least one of anonymization application programming interface, blockchain, differential privacy, and homomorphic encryption provided by the data market system.

According to another aspect of the invention, a data structure of the encrypted data packet includes an encrypted internet protocol address, an encrypted owner identity, and encrypted data.

According to another aspect of the invention, the data market system further includes an output surface circuit, wherein the processor processes the encrypted data packet to obtain a processing result according to the query, and controls the output surface circuit to output the processing result.

According to another aspect of the invention, an owner registered in the data market system first utilizes the anonymization application programming interface, the blockchain, and the differential privacy and the blockchain through a user interface (UI) of the data market system to encrypt an internet protocol address, an owner identity, and data to obtain the encrypted internet protocol address, the encrypted owner identity, and the encrypted data, respectively.

According to another aspect of the invention, the encrypted data is not analyzed to obtain the owner identity corresponding to the data, and the processor executes statistics analysis on the encrypted data according to the query to obtain the processing result, wherein a trend change in statistics characteristic of the processing result consists with a trend change in statistics characteristic of the data, but accuracy of the statistics characteristic of the processing result is lower than accuracy of the statistics characteristic of the data.

According to another aspect of the invention, an owner registered in the data market system first utilizes the anonymization application programming interface, the blockchain, and the homomorphic encryption and the blockchain through a user interface of the data market system to encrypt an internet protocol address, an owner identity, and data to obtain the encrypted internet protocol address, the encrypted owner identity, and the encrypted data, respectively.

According to another aspect of the invention, the processor directly executes operation on the encrypted data according to the query to obtain the processing result, and the processing result is still encrypted by the homomorphic encryption, wherein the processing result is capable being decrypted by a private key provided by the owner.

According to another aspect of the invention, a buyer registered in the data market system issues the query to the data market system through a user interface of the data market system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
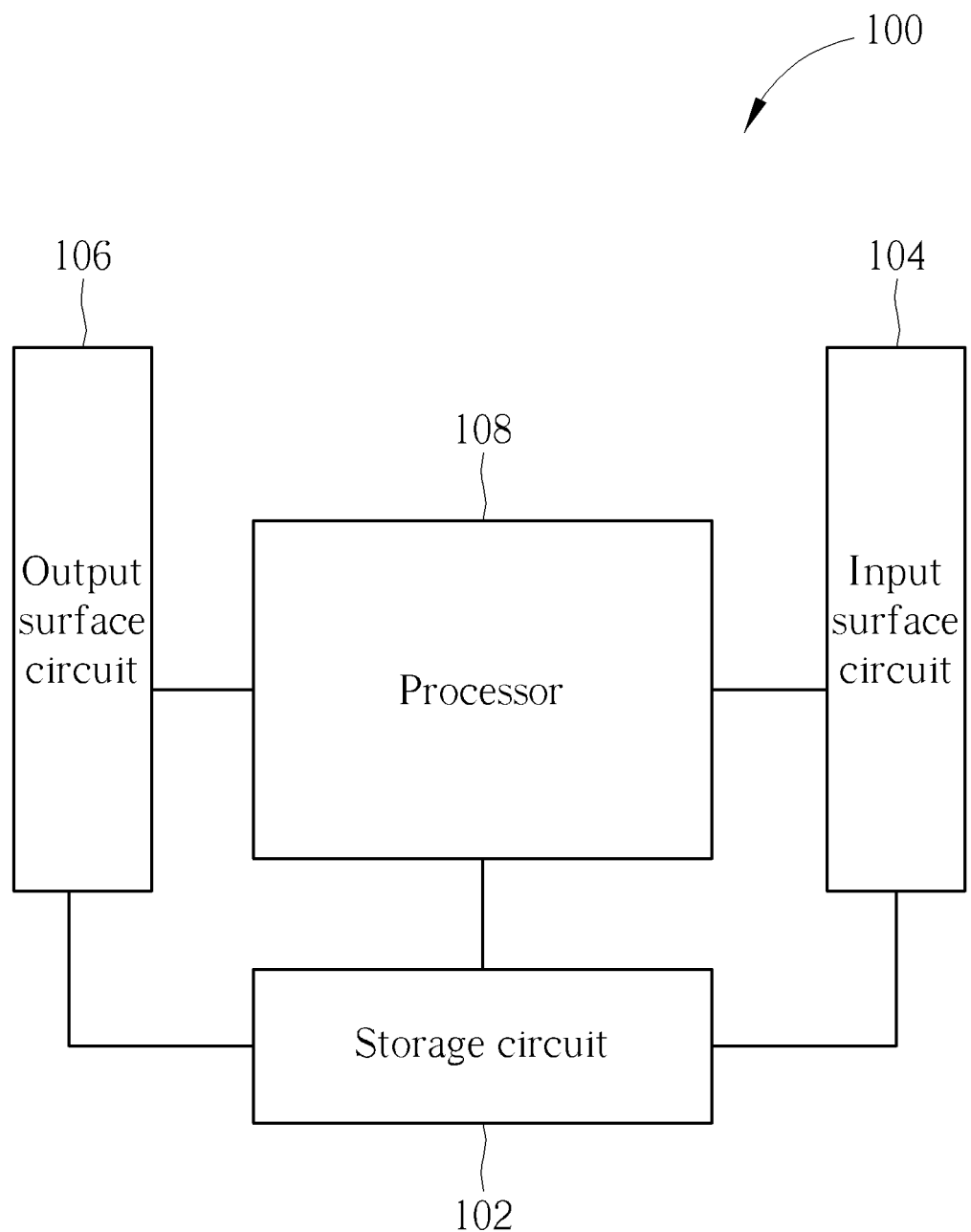
FIG. 1 is a diagram illustrating a data market system located in the Internet according to a first embodiment of the present invention.

Please refer to FIG. 1. FIG. 1 is a diagram illustrating a data market system 100 located in the Internet according to a first embodiment of the present invention, wherein the data market system 100 includes a storage circuit 102, an input surface circuit 104, an output surface circuit 106, and a processor 108, and coupling relationships between the storage circuit 102, the input surface circuit 104, the output surface circuit 106, and the processor 108 can be referred to FIG. 1, so further description thereof is omitted for simplicity. In addition, the data market system 100 can be a server or a website. In addition, storage circuit 102 can be dynamic random access memory (DRAM), synchronous dynamic random-access memory (SDRAM), static random access memory (SRAM), read-only memory (ROM), or other memory circuits.

Figure 2A:
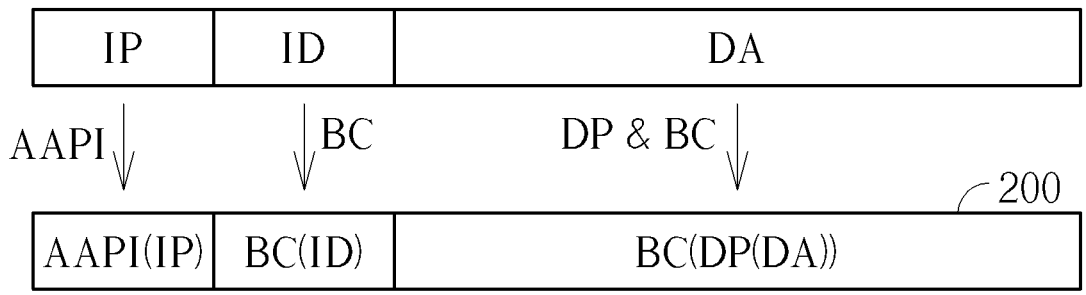
FIG. 2A, FIG. 2B, and FIG. 2 C are diagrams illustrating data structures of encrypted data packets.
Figure 2B:
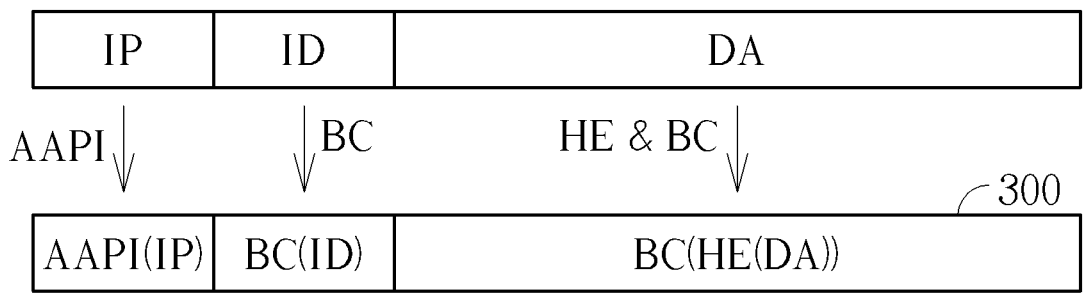
Figure 2C:

As shown in FIG. 2A, an owner registered in the data market system 100 can first connect to the data market system 100 through the Internet. Then, the owner utilizes anonymization application programming interface AAPI (e.g. the onion router, Tor), blockchain BC, and differential privacy DP and the blockchain BC provided by the data market system 100 through a user interface of the data market system 100 to encrypt an internet protocol address IP corresponding to an electronic device, an owner identity ID, and data DA in the electronic device to obtained an encrypted internet protocol address AAPI(IP), an encrypted owner identity BC(ID), and an encrypted data BC(DP(DA)) included in a data structure of an encrypted data packet 200, respectively, wherein the electronic device is held by the owner. But, in another embodiment of the present invention, As shown in FIG. 2B, the owner utilizes the anonymization application programming interface AAPI, the blockchain BC, and homomorphic encryption HE and the blockchain BC to encrypt the internet protocol address IP, the owner identity ID, and the data DA to obtained an encrypted internet protocol address AAPI(IP), an encrypted owner identity BC(ID), and an encrypted data BC(HE(DA)) included in a data structure of an encrypted data packet 300, respectively. But, in further another embodiment of the present invention, a data structure of an encrypted data packet 400 (as shown in FIG. 2C) includes an encrypted internet protocol address AAPI(IP), an encrypted owner identity BC(ID), and an encrypted data BC(DP(DA)) and an encrypted data BC(HE(DA)). In addition, after the encrypted data packet 200 (or the encrypted data packet 300, or the encrypted data packet 400) is generated in the electronic device, the owner can issue an upload command through the user interface of the data market system 100. After the processor 108 receives the upload command, the processor 108 can control the input surface circuit 104 to receive the encrypted data packet 200 (or the encrypted data packet 300, or the encrypted data packet 400) and control the input surface circuit 104 to store the encrypted data packet 200 (or the encrypted data packet 300, or the encrypted data packet 400) into the storage circuit 102.

Figure 3:
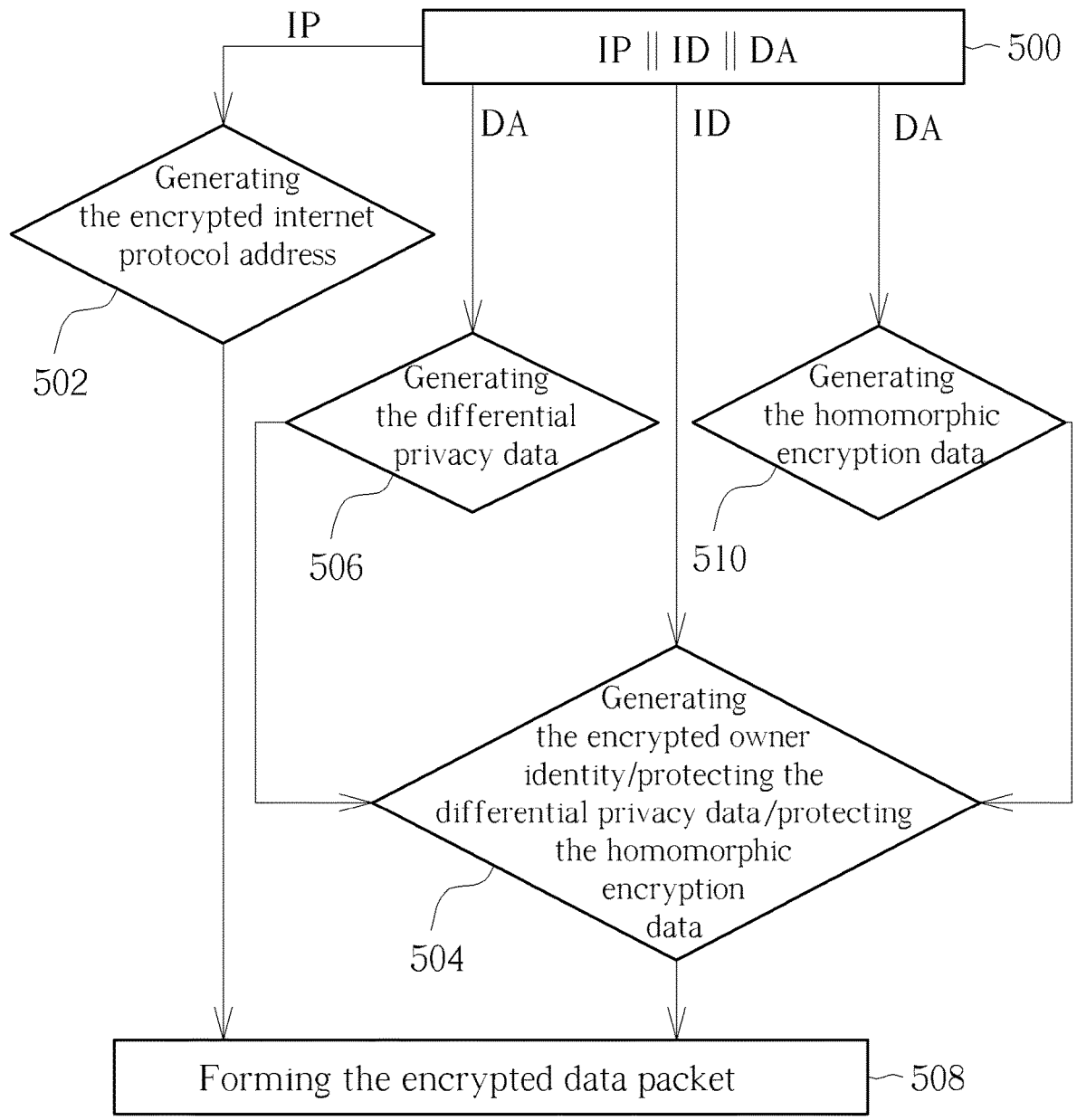
FIG. 3 is a flowchart illustrating generating the encrypted data packet.

Please refer to FIG. 3. FIG. 3 is a flowchart illustrating generating the encrypted data packet 200, the encrypted data packet 300, and the encrypted data packet 400, wherein ll represents concatenation, and in Step 500, the internet protocol address IP, the owner identity ID, and the data DA are concatenated together in the electronic device. As shown in FIG. 3, taking generating the encrypted data packet 200 as an example, in Step 502, the anonymization application programming interface AAPI can anonymize the internet protocol address IP to obtain the encrypted internet protocol address AAPI(IP), wherein encrypted internet protocol address AAPI(IP) can make the internet protocol address IP not revealed, and in Step 504, the blockchain BC can anonymize the owner identity ID to obtain the encrypted owner identity BC(ID), wherein the encrypted owner identity BC(ID) can make the owner identity ID not revealed. Therefore, because the blockchain BC can anonymize the owner identity ID, the data market system 100 is a decentralized database. In addition, in Step 506, the owner can first utilize the differential privacy DP to efficiently perturb the data DA to generate differential privacy data DP(DA). Then, execute Step 504 on the differential privacy data DP(DA) and utilize the blockchain BC to protect integrity of the differential privacy data DP(DA) to generate encrypted data BC(DP(DA)), wherein the encrypted data BC(DP(DA)) can ensure that a buyer (or an analyzer) registered in the data market system 100 cannot identify the owner identity ID corresponding to the encrypted data BC(DP(DA)) through cross analysis on the encrypted data BC(DP(DA)). Finally, in Step 508, the encrypted internet protocol address AAPI (IP), the encrypted owner identity BC(ID), and the encrypted data BC(DP(DA)) are concatenated together to formed the encrypted data packet 200. In addition, although the differential privacy DP can efficiently perturb the data DA to generate the differential privacy data DP(DA), a trend change in statistics characteristics of the encrypted data BC(DP(DA)) still consists with a trend change in statistics characteristic of the data DA. However, even if the trend change in statistics characteristics of the encrypted data BC(DP(DA)) still consists with the trend change in statistics characteristic of the data DA, but accuracy of the statistics characteristic of the encrypted data BC(DP(DA)) is lower than accuracy of the statistics characteristic of the data DA. In addition, because when the owner utilizes the differential privacy DP to generate the differential privacy data DP(DA) in the electronic device, the electronic device uses fewer operation resource, generation cost and data analysis accuracy of the differential privacy data DP(DA) are lower. Thus, because the differential privacy data DP(DA) has the lower data analysis accuracy, when the buyer (or the analyzer) purchases the differential privacy data DP(DA), purchase cost of the differential privacy data DP(DA) is lower.

In addition, as shown in FIG. 3, taking generating the encrypted data packet 300 as an example, Step 502 and Step 504 can be referred to the above-mentioned descriptions about generating the encrypted data packet 200, so further description thereof is omitted for simplicity. In Step 510, the owner can first utilize the homomorphic encryption HE to encrypt the data DA to generate homomorphic encryption data HE(DA). Then, execute Step 504 on the homomorphic encryption data HE(DA) and utilize the blockchain BC to protect integrity of the homomorphic encryption data HE(DA) to generate encrypted data BC(HE(DA)). Finally, in Step 508, the encrypted internet protocol address AAPI (IP), the encrypted owner identity BC(ID), and the encrypted data BC(HE(DA)) are concatenated together to formed the encrypted data packet 300. In addition, a characteristic of the encrypted data BC(HE(DA)) is that the processor 108 can directly execute operation (e.g. specific algebra operation) on the encrypted data BC(HE(DA)) in encryption domain to generate a processing result (the processing result is still encrypted by the homomorphic encryption HE), wherein the processing result is the same as an operation result generated by the processor 108 executing the operation (e.g. specific algebra operation) on the data DA (not encrypted by the homomorphic encryption HE). In addition, because when the owner utilizes the homomorphic encryption HE to generate the homomorphic encryption data HE(DA) in the electronic device, the electronic device uses more operation resource, generation cost and data analysis accuracy of the homomorphic encryption data HE(DA) are higher.

In addition, as shown in FIG. 3, taking generating the encrypted data packet 400 as an example, Step 502, Step 504, and Step 506 can be referred to the above-mentioned descriptions about generating the encrypted data packet 200, so further description thereof is omitted for simplicity. Step 510 can be referred to the above-mentioned descriptions about generating the encrypted data packet 300, so further description thereof is also omitted for simplicity. Finally, in Step 508, the encrypted internet protocol address AAPI(IP), the encrypted owner identity BC(ID), the encrypted data BC(DP(DA)), and the encrypted data BC(HE(DA)) are concatenated together to formed the encrypted data packet 400.

Figure 4:
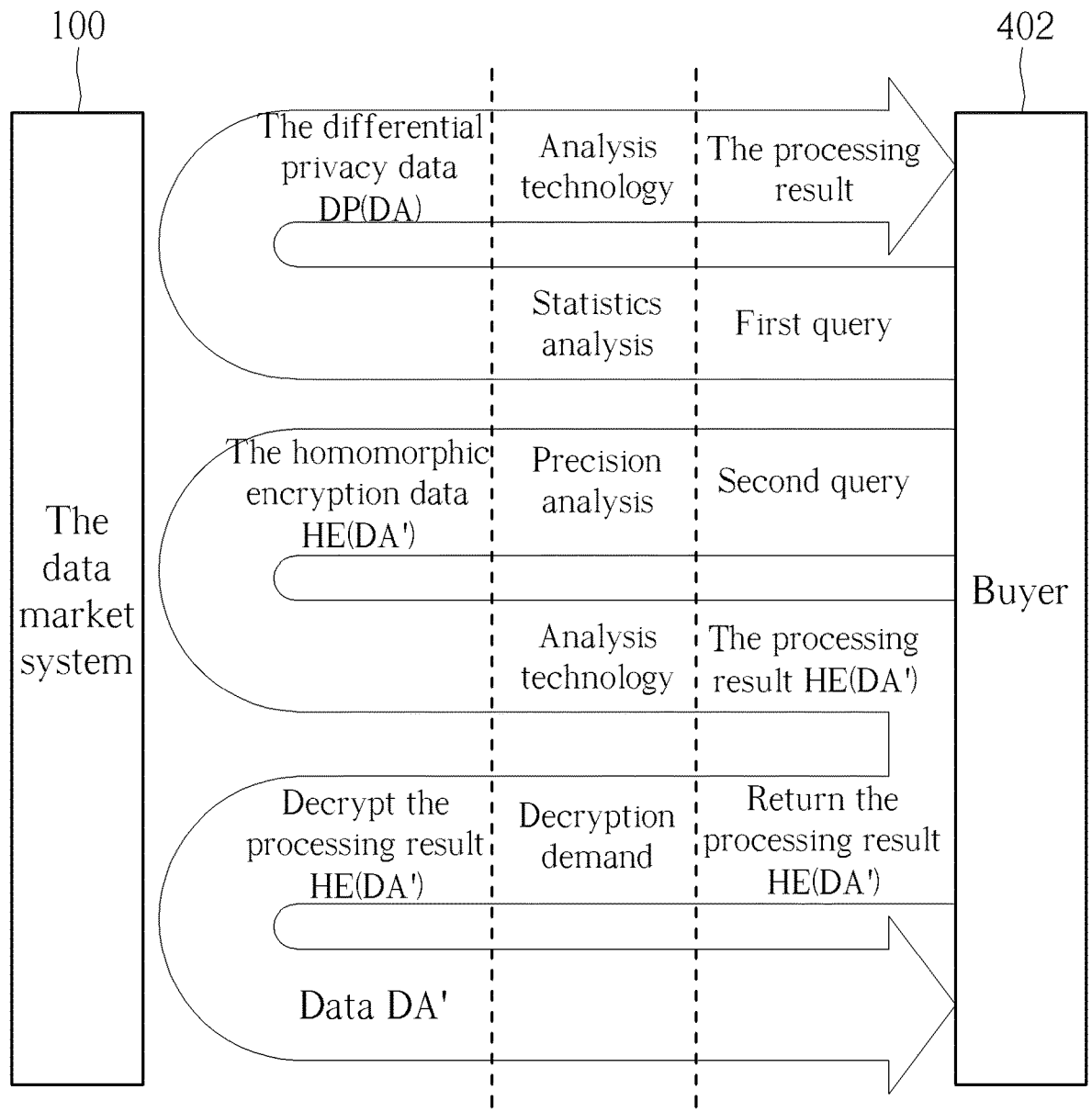
FIG. 4 is a diagram illustrating relationships between a buyer (or an analyzer) registered in the data market system and the data market system.

Please refer to FIG. 4. FIG. 4 is a diagram illustrating relationships between a buyer (or an analyzer) 402 registered in the data market system 100 and the data market system 100, wherein for example, encrypted data packets stored in the storage circuit 102 of the data market system 100 correspond to gene series, transactions, symptom events, and so on. As shown in FIG. 4, after the buyer 402 connect to the data market system 100 through the Internet, the buyer 402 can issue a first query to the data market system 100 through the user interface of the data market system 100, wherein for example, demand corresponding to the first query is statistics analysis. Meanwhile, the input surface circuit 104 can receive the first query and transmit the first query to the processor 108. Because the demand corresponding to the first query is statistics analysis (rather than precision analysis), the processor 108 can find an encrypted data packet (wherein a data structure of the encrypted data packet can be referred to the data structure of the encrypted data packet 200) corresponding to the first query in the storage circuit 102, and process differential privacy data DP(DA) included in the encrypted data packet through analysis technology (e.g. statistics analysis) to obtain a processing result (e.g. synthetic dataset). Afterwards, the processor 108 can control the output surface circuit 106 to output the processing result to the buyer 402, and the buyer 402 can execute some statistics analysis applications (e.g. statistics analysis applications of government policy, research publish, business decision, medical order, and so on) according to statistics characteristic of the processing result (e.g. synthetic dataset).

In addition, as shown in FIG. 4, when the buyer 402 issues a second query to the data market system 100 through the user interface of the data market system 100, wherein demand corresponding to the second query is precision analysis, meanwhile the input surface circuit 104 can receive the second query and transmit the second query to the processor 108. Because the demand corresponding to the second query is precision analysis, the processor 108 can find an encrypted data packet corresponding to the second query in the storage circuit 102, and process homomorphic encryption data HE(DA') included in the encrypted data packet through analysis technology (e.g. the specific algebra operation) to obtain a processing result HE(DA'). Afterwards, the processor 108 can control the output surface circuit 106 to output the processing result HE(DA') to the buyer 402. However, when the buyer 402 needs each datum in the processing result HE(DA'), the buyer 402 can return the processing result HE(DA') to the data market system 100 and issue decryption demand to the data market system 100. After the data market system 100 receives the decryption demand and the processing result HE(DA'), the data market system 100 can utilize a private key provided by the owner to decrypt the processing result HE(DA') to obtain data DA'. Afterwards, the processor 108 can control the output surface circuit 106 to output the data DA' to the buyer 402, and the buyer 402 can execute some precise statistics analysis applications (e.g. statistics analysis applications of government policy, research publish, business decision, medical order, and so on) according to the data DA'. In addition, because the buyer 402 can obtain the data DA' finally, purchase cost paid by the buyer 402 for obtaining the data DA' is higher.

Therefore, compared to the prior art, the data market system 100 has advantages as follows:
1) the data market system 100 can provide more flexible data usage/analysis through encrypted data packets applying different data protection technologies (e.g. the differential privacy DP and the homomorphic encryption HE);
2) because the data market system 100 allows the owner to upload the encrypted data packets applying different data protection technologies (e.g. the differential privacy DP and the homomorphic encryption HE) to the data market system 100, the data market system 100 can provide diversified data types (categorical, numerical data) to make data more usable;
3) because the owner can utilize the anonymization application programming interface AAPI, the blockchain BC, and the differential privacy DP (or utilize the anonymization application programming interface AAPI, the blockchain BC, and the homomorphic encryption HE) provided by the data market system 100 to generate the encrypted data packet, the anonymization application programming interface AAPI and the blockchain BC can anonymize (encrypt) the internet protocol address IP corresponding to the electronic device held by the owner and the owner identity ID respectively to protect privacy of the owner.

In addition, because one of ordinary skill in the art should clearly realize functions of the controller 202 through the above-mentioned corresponding descriptions of the input surface circuit 104, the output surface circuit 106, and the processor 108, one of ordinary skill in the art can easily implement the input surface circuit 104, the output surface circuit 106, and the processor 108 through field programmable gate arrays (FPGAS) with the above-mentioned functions of the input surface circuit 104, the output surface 106, circuit and the processor 108, or application-specific integrated circuits (ASICs) with the above-mentioned functions of the input surface circuit 104, the output surface circuit 106, and the processor 108, or software modules with the above-mentioned functions of the input surface circuit 104, the output surface circuit 106, and the processor 108, or analog integrated circuits with the above-mentioned functions of the input surface circuit 104, the output surface circuit 106, and the processor 108. Therefore, further descriptions of corresponding structures of the input surface circuit 104, the output surface circuit 106, and the processor 108 are not necessary to disclose, that is, the descriptions of the corresponding structures of the input surface circuit 104, the output surface circuit 106, and the processor 108 can be omitted for simplicity.

Figure 5:
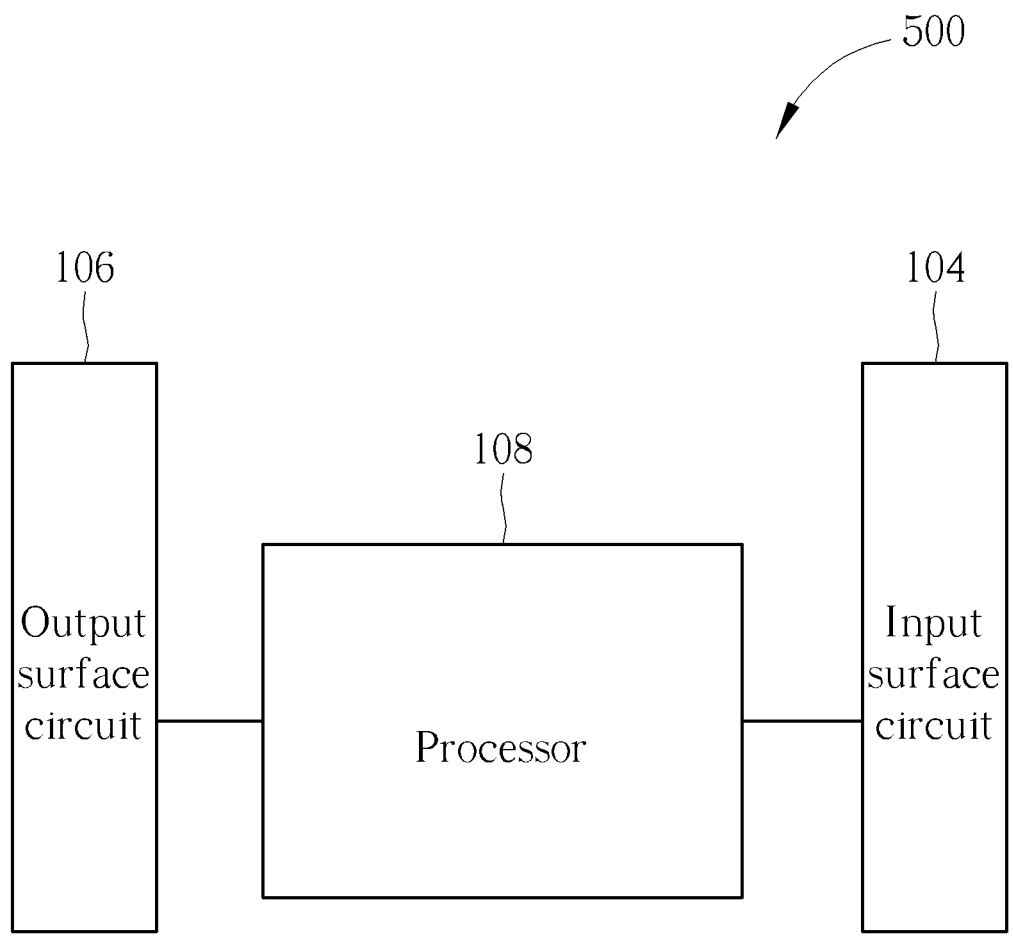
FIG. 5 is a diagram illustrating a data market system located in the Internet according to a second embodiment of the present invention.

Please refer to FIG. 5. FIG. 5 is a diagram illustrating a data market system 500 located in the Internet according to a second embodiment of the present invention, wherein the data market system 500 includes the input surface circuit 104, the output surface circuit 106, and the processor 108, and the data market system 500 can be a server or a website.

Figure 6:
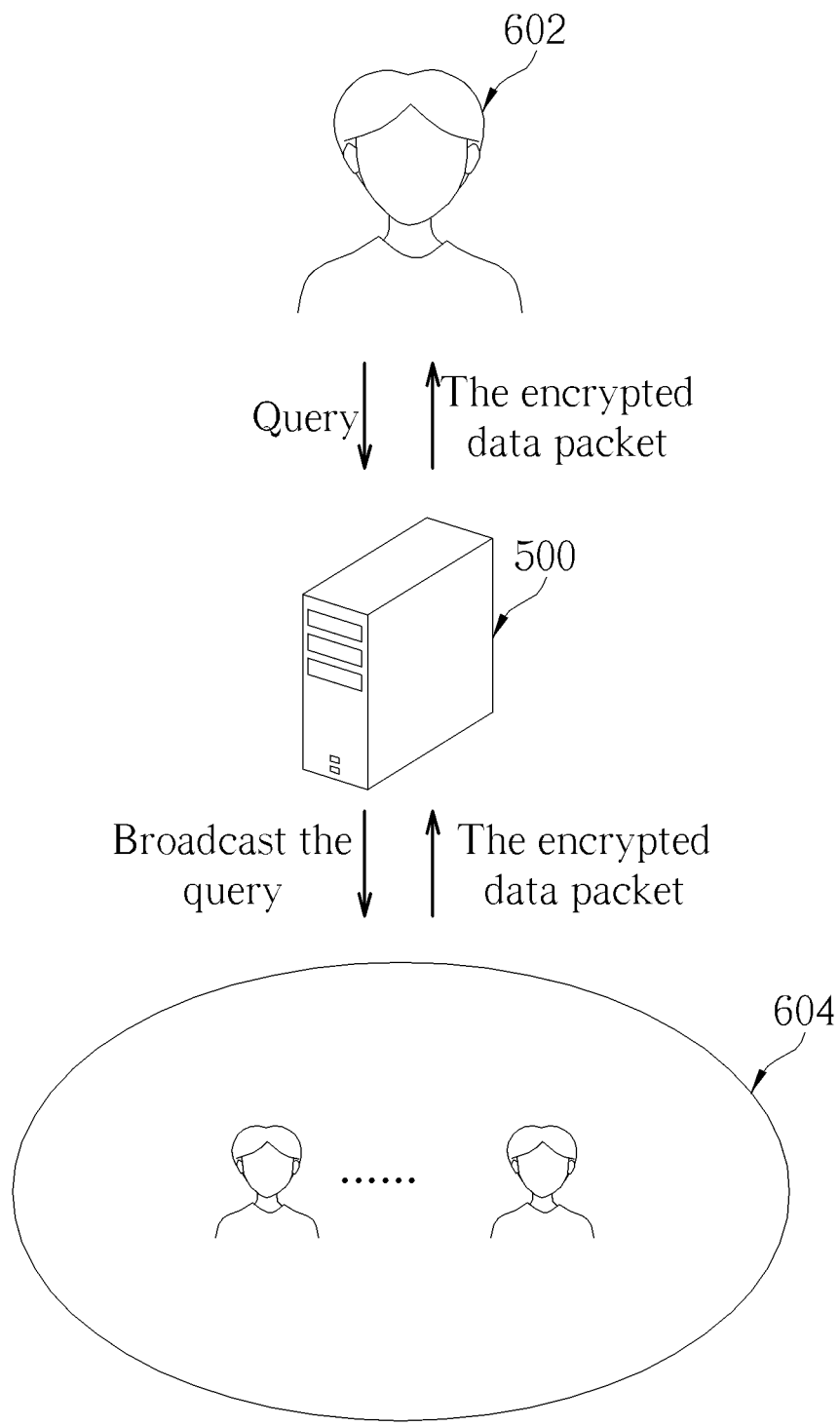
FIG. 6 is a diagram illustrating relationships between the buyer, the data market system, and the owners.

As shown in FIG. 6, because the data market system 500 does not include a storage circuit, when a buyer (or an analyzer) 602 registered in the data market system 500 issues query to the data market system 500 through a user interface of the data market system 500, the input surface circuit 104 can receive the query and transmit the query to the processor 108, and the processor 108 can broadcast the query in the Internet through the output surface circuit 106. In the Internet, for example, if an owner of owners 604 registered in the data market system 500 has data matching the query, the owner can utilize the anonymization application n programming interface AAPI, blockchain BC, and differential privacy DP, (or the anonymization application programming interface AAPI, the blockchain BC, and homomorphic encryption HE) provided by the data market system 500 through a user interface of the data market system 500 to encrypt internet protocol address corresponding to an electronic device held by the owner, owner identity, and the data in the electronic device to obtain an encrypted data packet, and upload the encrypted data packet to the data market system 500. After the data market system 500 receives the encrypted data packet, the processor 108 can transmit the encrypted data packet to the buyer (or the analyzer) 602 through the output surface circuit 106. In addition, subsequent operational principles of the data market system 500 are the same as those of the data market system 100, so further description thereof is omitted for simplicity.

To sum up, the data market system provided by the present invention has advantages as follows: 1) the data market system can provide more flexible data usage/analysis through encrypted data packets applying different data protection technologies (e.g. the differential privacy and the homomorphic encryption); 2) because the data market system allows the owner to upload the encrypted data packets applying different data protection technologies (e.g. the differential privacy and the homomorphic encryption) to the data market system, the data market system can provide diversified data types (categorical, numerical data) to make data more usable; 3) because the owner can utilize the anonymization application programming interface, the blockchain, and the differential privacy (or utilize the anonymization application programming interface, the blockchain, and the homomorphic encryption) provided by the data market system to generate the encrypted data packet, the data market system can anonymize (encrypt) the internet protocol address corresponding to the electronic device held by the owner and the owner identity respectively to protect privacy of the owner.

Although the present invention has been illustrated and described with reference to the embodiments, it is to be understood that the present invention is not to be limited to the disclosed embodiments, but on the contrary, is intended to cover various modifications and equivalent arrangements included within the spirit and scope of the appended claims.

What is claimed is:

1. A data market system located in the Internet, comprising:
 a storage circuit;
 an input surface circuit receiving a query and an encrypted data packet;
 a processor controlling the input surface circuit to receive the encrypted data packet and to store the encrypted data packet in the storage circuit; and
 an output surface circuit, wherein the processor processes the encrypted data packet to obtain a processing result according to the query, and controls the output surface circuit to output the processing result;

wherein the processor processes the encrypted data packet according to the query, and the encrypted data packet corresponds to at least one of anonymization application programming interface, blockchain, differential privacy, and homomorphic encryption provided by the data market system;

wherein an owner registered in the data market system first utilizes the anonymization application programming interface, the blockchain, and the homomorphic encryption and the blockchain through a user interface of the data market system to encrypt an internet protocol address, an owner identity, and data to obtain an encrypted internet protocol address, an encrypted owner identity, and encrypted data, respectively.

2. The data market system of claim 1, wherein a data structure of the encrypted data packet comprises the encrypted Internet protocol (IP) address, the encrypted owner identity, and the encrypted data, wherein the encrypted data packet corresponds to differential privacy data or/and homomorphic encryption data.

3. A data market system located in the Internet, comprising:
- a storage circuit;
- an input surface circuit receiving a query and an encrypted data packet;
- a processor controlling the input surface circuit to receive the encrypted data packet and to store the encrypted data packet in the storage circuit; and
- an output surface circuit, wherein the processor processes the encrypted data packet to obtain a processing result according to the query, and controls the output surface circuit to output the processing result;
- wherein the processor processes the encrypted data packet according to the query, and the encrypted data packet corresponds to at least one of anonymization application programming interface, blockchain, differential privacy, and homomorphic encryption provided by the data market system;
- wherein an owner registered in the data market system first utilizes the anonymization application programming interface, the blockchain, and the differential privacy and the blockchain through a user interface (UI) of the data market system to encrypt an internet protocol address, an owner identity, and data to obtain the encrypted internet protocol address, the encrypted owner identity, and the encrypted data, respectively;
- wherein the encrypted data is not analyzed to obtain the owner identity corresponding to the data, and the processor executes statistics analysis on the encrypted data according to the query to obtain the processing result, wherein a trend change in statistics characteristic of the processing result consists with a trend change in statistics characteristic of the data, but accuracy of the statistics characteristic of the processing result is lower than accuracy of the statistics characteristic of the data;
- wherein the encrypted data is not analyzed to obtain the owner identity corresponding to the data, and the processor executes statistics analysis on the encrypted data according to the query to obtain the processing result, wherein a trend change in statistics characteristic of the processing result consists with a trend change in statistics characteristic of the data, but accuracy of the statistics characteristic of the processing result is lower than accuracy of the statistics characteristic of the data.

4. The data market system of claim 1, wherein the processor directly executes operation on the encrypted data according to the query to obtain the processing result, and the processing result is still encrypted by the homomorphic encryption, wherein the processing result is capable being decrypted by a private key provided by the owner.

5. The data market system of claim 1, wherein a buyer registered in the data market system issues the query to the data market system through a user interface of the data market system.

6. A data market system located in the Internet, comprising:
- an input surface circuit;
- a processor; and
- an output surface circuit;
- wherein after the input surface circuit receives a query and transmits the query to the processor, the processor broadcasts the query in the Internet and receives an encrypted data packet corresponding to the query through the input surface circuit, and processes the encrypted data packet according to the query, wherein the encrypted data packet corresponds to at least one of anonymization application programming interface, blockchain, differential privacy, and homomorphic encryption provided by the data market system;
- wherein the processor processes the encrypted data packet to obtain a processing result according to the query, and controls the output surface circuit to output the processing result;
- wherein an owner registered in the data market system first utilizes the anonymization application programming interface, the blockchain, and the homomorphic encryption and the blockchain through a user interface of the data market system to encrypt an internet protocol address, an owner identity, and data to obtain an encrypted internet protocol address, an encrypted owner identity, and encrypted data, respectively.

7. The data market system of claim 6, wherein a data structure of the encrypted data packet comprises the encrypted internet protocol address, the encrypted owner identity, and the encrypted data, wherein the encrypted data packet corresponds to differential privacy data or/and homomorphic encryption data.

8. A data market system located in the Internet, comprising:
- an input surface circuit;
- a processor; and
- an output surface circuit, wherein the processor processes encrypted data packet to obtain a processing result according to a query, and controls the output surface circuit to output the processing result;
- wherein after the input surface circuit receives the query and transmits the query to the processor, the processor broadcasts the query in the Internet and receives the encrypted data packet corresponding to the query through the input surface circuit, and processes the encrypted data packet according to the query, wherein the encrypted data packet corresponds to at least one of anonymization application programming interface, blockchain, differential privacy, and homomorphic encryption provided by the data market system;
- wherein an owner registered in the data market system first utilizes the anonymization application programming interface, the blockchain, and the differential privacy and the blockchain through a user interface (UI) of the data market system to encrypt an internet protocol address, an owner identity, and data to obtain the encrypted internet protocol address, the encrypted owner identity, and the encrypted data, respectively.

9. The data market system of claim 6, wherein the processor directly executes operation on the encrypted data according to the query to obtain the processing result, and the processing result is still encrypted by the homomorphic encryption, wherein the processing result is capable being decrypted by a private key provided by the owner.

10. The data market system of claim 6, wherein a buyer registered in the data market system issues the query to the data market system through a user interface of the data market system.

* * * * *